UNITED STATES PATENT OFFICE.

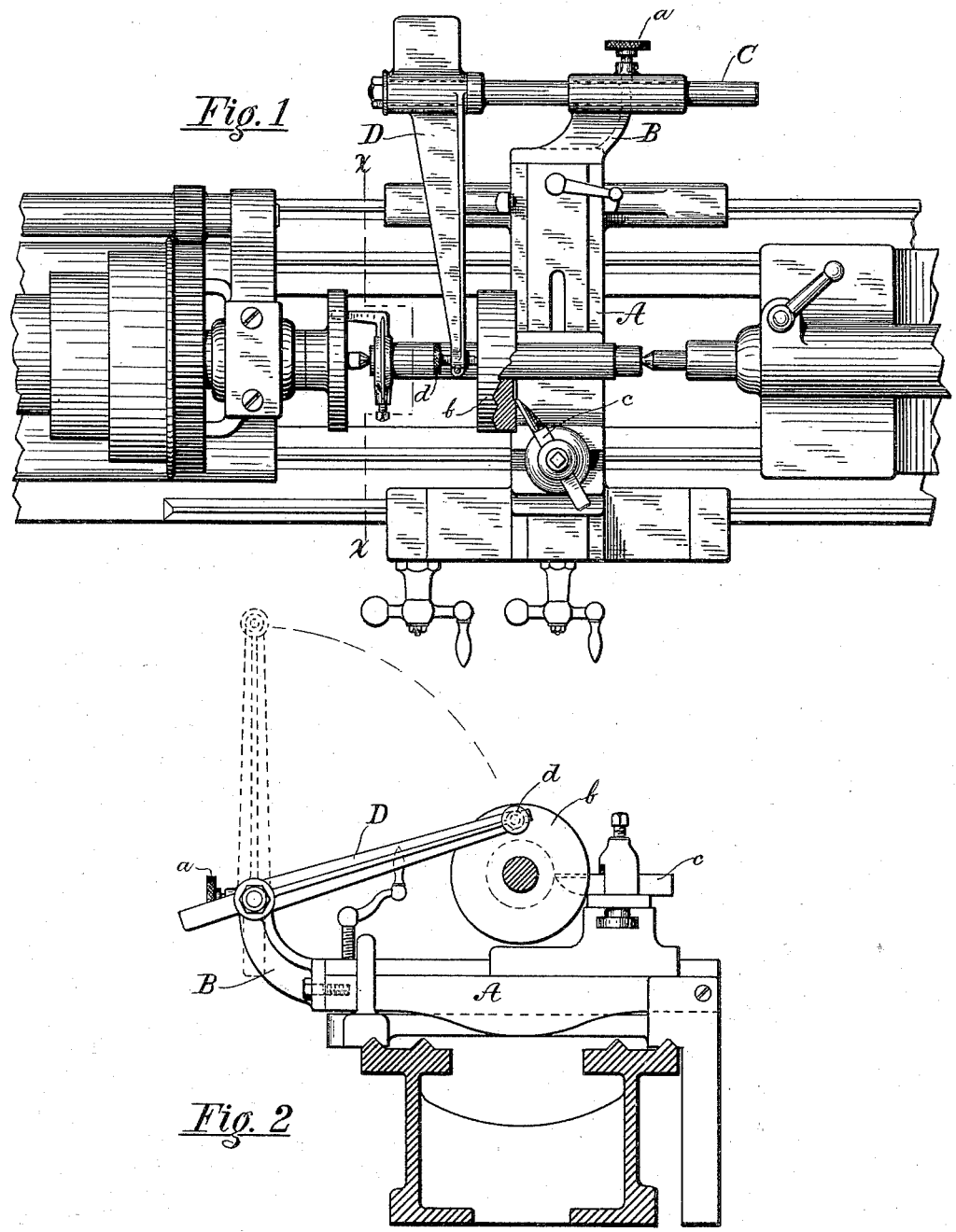

OSCAR J. BEALE, OF PROVIDENCE, RHODE ISLAND, ASSIGNOR TO THE BROWN & SHARPE MANUFACTURING COMPANY, OF SAME PLACE.

LATHE ATTACHMENT.

SPECIFICATION forming part of Letters Patent No. 493,807, dated March 21, 1893.

Application filed December 20, 1892. Serial No. 455,751. (No model.)

*To all whom it may concern:*

Be it known that I, OSCAR J. BEALE, of the city and county of Providence, in the State of Rhode Island, have invented certain new and useful Improvements in Lathe Attachments; and I do hereby declare the following specification, taken in connection with the accompanying drawings, forming a part of the same, to be a full, clear, and exact description thereof.

The object of the invention is to provide means for accurately determining the position of the cutting tool in squaring off blanks, in order to secure the reduction of the blank to the exact thickness required.

To that end the invention consists primarily in the combination, with the tool carriage and cutting tool of a lathe, of a gage mounted upon and movable with the tool carriage, said gage being adjustable with relation to said tool carriage in the direction in which said carriage moves.

The invention further consists in certain combinations and arrangements of parts hereinafter described.

Referring to the drawings, Figure 1 is a top or plan view of a portion of a lathe with my invention applied thereto, and Fig. 2 is a transverse section of the same on the line $x, x$, Fig. 1.

The parts of the lathe proper represented in the accompanying drawings are of ordinary construction and will require no description in this connection.

To the tool carriage A is secured a bracket B of suitable shape. In the bracket B a bar C is mounted so as to be capable of longitudinal adjustment in said bracket, said bar being held in its adjusted position by the clamp-screw $a$. To the end of the bar C is attached an arm or gage D, said gage being preferably mounted upon the bar C so that it can be turned or swung thereon, as shown in the drawings.

$b$ represents a blank or piece of work to be squared off and reduced to a given thickness, said blank being held between the centers of the lathe in the usual manner.

$c$ is the cutting tool which is represented in the drawings as making a cut from the axis of the blank $b$ toward its periphery.

The outer or free end of the gage arm D is preferably provided with an adjusting screw $d$, as shown.

The manner of using the parts above described to secure the desired results is as follows: Suppose it be desired to reduce the blank $b$ to a thickness of exactly one inch. Before the blank is inserted in the lathe the gage D is brought down into a position where the distance between the point of the adjusting screw $d$ and the cutting edge of the tool $c$ can be conveniently measured or determined. The cutting tool being properly located with relation to the tool carriage, the point of the adjusting screw $d$ is then adjusted to a position exactly one inch from the cutting edge of the tool $c$, the proper position being determined in any convenient manner, as by the use of a test-block one inch in length, or by a pair of inside calipers. This adjustment may be effected either by adjusting the bar C in the bracket D, or by adjusting the screw $d$ in the gage arm D, or, if desired, by both of said adjustments. When the adjustment has been properly effected, the bar C is secured in its adjusted position, and the gage arm D is then swung up out of the way and in the position indicated in dotted lines, Fig. 2. One side of the blank $b$ having been squared off either before or after the adjustment of the parts above described, the operation of squaring off the other side is commenced in the usual manner, the gage arm being out of the way. When the blank has been brought down to such a thickness that only one cut remains to be taken, the operator brings down the gage arm D, and then by moving the tool carriage, runs up the tool $c$ to take a cut until the point of the adjusting screw $d$ will just pass the blank, as shown in Fig. 1. This will accurately determine the position of the tool for making the last cut, and so that when the cut is made the blank $b$ will be reduced to a thickness of exactly one inch. In the same manner the precise position of the cutting tool may be determined for reducing the blank exactly to any other thickness required.

While I prefer, for convenience, to make use of the adjusting screw $d$ in the end of the gage arm D, such adjusting screw is not essential and may be omitted.

What I claim as my invention, and desire to secure by Letters Patent, is—

1. The combination, with the tool carriage and cutting tool of a lathe, of a gage mounted upon and movable with said tool carriage, said gage being adjustable with relation to said tool carriage in the direction in which said carriage moves, substantially as described.

2. The combination, with the tool carriage and cutting tool of a lathe, of a gage mounted upon and movable with said tool carriage, said gage being adjustable with relation to said tool carriage in the direction in which said carriage moves, and also having a movement in a plane at right angles to the path of movement of said tool carriage, substantially as described.

3. The combination, with the tool carriage and cutting tool of a lathe, of a swinging gage arm mounted upon and movable with said tool carriage, said gage arm being adjustable with relation to said tool carriage in the direction in which said carriage moves, and being provided at its free end with an adjusting screw, substantially as described.

OSCAR J. BEALE.

Witnesses:
JOHN HENSHAW,
S. J. MURPHY.